US011122000B1

(12) United States Patent
Saalfeld et al.

(10) Patent No.: US 11,122,000 B1
(45) Date of Patent: Sep. 14, 2021

(54) NOTIFYING A PUBLISHER OF LIFE-CYCLE EVENTS FOR TOPIC SUBSCRIPTION

(71) Applicant: Amazon Technologies, Inc., Seattle, WA (US)

(72) Inventors: Christoph Saalfeld, Seattle, WA (US); Dominique Fortier, Issaquah, WA (US); Nicholas A. Gochenaur, Seattle, WA (US); Himanshu Jindal, Seattle, WA (US); Venkata Harish Kommaraju, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/711,285

(22) Filed: Dec. 11, 2019

(51) Int. Cl.
| | | |
|---|---|---|
| *H04L 12/58* | (2006.01) | |
| *G06F 15/16* | (2006.01) | |
| *H04L 29/08* | (2006.01) | |
| *H04L 12/26* | (2006.01) | |
| *H04L 29/06* | (2006.01) | |

(52) U.S. Cl.
CPC ............ *H04L 51/26* (2013.01); *H04L 51/046* (2013.01); *H04L 51/22* (2013.01); *H04L 67/42* (2013.01)

(58) Field of Classification Search
CPC ....... H04L 51/26; H04L 51/046; H04L 51/22; H04L 67/42
See application file for complete search history.

(56) References Cited

U.S. PATENT DOCUMENTS

| | | | |
|---|---|---|---|
| 8,949,348 B2 | 2/2015 | Banks et al. | |
| 2005/0021622 A1 | 1/2005 | Cullen | |
| 2006/0047666 A1* | 3/2006 | Bedi | G06F 16/958 |
| 2007/0174233 A1* | 7/2007 | Ginis | H04L 41/145 |
| 2008/0133337 A1* | 6/2008 | Fletcher | G06F 16/958 705/7.11 |
| 2008/0235709 A1* | 9/2008 | Roberts | G06Q 10/10 719/313 |
| 2009/0182742 A1* | 7/2009 | Stewart | G06F 16/335 |
| 2009/0290503 A1* | 11/2009 | Preston | H04L 67/145 370/252 |
| 2010/0179996 A1* | 7/2010 | Jones | G06Q 10/107 709/206 |
| 2011/0099232 A1* | 4/2011 | Gupta | H04L 67/26 709/206 |
| 2011/0185367 A1* | 7/2011 | Rousselle | G06F 9/546 719/313 |
| 2019/0075192 A1* | 3/2019 | Mamas | H04L 67/04 |

\* cited by examiner

*Primary Examiner* — Christopher B Robinson
(74) *Attorney, Agent, or Firm* — Robert C. Kowert; Kowert, Hood, Munyon, Rankin & Goetzel, P.C.

(57) ABSTRACT

A message broker of a publish-subscribe messaging system (e.g., using the MQTT protocol or other publish-subscribe protocol) detects a life-cycle event for topic subscription and notifies a publisher of the life-cycle event. The message broker may detect a transition in a number of subscribers to a topic from zero subscribers to one or more subscribers or from one or more subscribers to zero subscribers. In response, the message broker provides an indication to the publisher that the number of subscribers to the topic has transitioned from zero to one or more (or from one or more to zero). This causes the publisher to begin publishing messages on the publisher's topic (or to stop publishing messages on the publisher's topic).

20 Claims, 7 Drawing Sheets

NOTIFYING A PUBLISHER OF LIFE-CYCLE EVENTS FOR TOPIC SUBSCRIPTION

BACKGROUND

The Internet of Things (IoT) is a phrase given for the interconnection of computing devices scattered around the globe within the existing internet infrastructure. IoT devices may be used for a variety of applications. For industrial applications, different sensors along an assembly line of a manufacturing plant may each generate data and send the data to another device or application that processes the data and displays the current status of the equipment on the assembly line. An operator may use the data to assess equipment health, production output, or to identify potential imminent failure of pieces of manufacturing equipment.

IoT devices may use a publish-subscribe messaging system to communicate messages between publishers and subscribers. An example of a publish-subscribe protocol is message queuing telemetry transport (MQTT). In a publish-subscribe messaging system, a number of devices may subscribe to a topic and another device may publish messages to the topic. For example, a temperature sensor may publish the current temperature of a piece of equipment to a "temperature" topic every five minutes. One or more different monitoring devices may each subscribe to the temperature topic. Every five minutes, each of the monitoring devices receives a message that indicates the current temperature. However, it may be the case that there are no longer any monitoring devices that are subscribed to a topic (e.g., due to a disconnection or power-down). In such cases, the temperature sensor may be wasting bandwidth and network resources to publish messages to the temperature topic because there are no subscribers to use the data.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for notifying a publisher of life-cycle events for topic subscription. In embodiments, a message broker of a publish-subscribe messaging system (e.g., using the MQTT protocol or other publish-subscribe protocol) detects a life-cycle event for topic subscription and notifies a publisher of the life-cycle event. In embodiments, a life-cycle event is a transition regarding whether or not there are one or more subscribers to a topic. For example, a message broker may detect a transition in a number of subscribers to a topic from zero subscribers to one or more subscribers. As another example, the message broker may detect a transition in a number of subscribers to the topic from one or more subscribers to zero subscribers.

In some embodiments, in response to the detection of the transition in the number of subscribers to the topic from zero to one or more (or from one or more to zero), the message broker will provide an indication to the publisher that the number of subscribers to the topic has transitioned from zero to one or more (or from one or more to zero). In embodiments, providing an indication to the publisher that the number of subscribers to the topic has transitioned from zero to one or more causes the publisher to begin publishing messages to the topic. For example, a temperature sensor may begin publishing the currently measured temperature to the "temperature" topic every five minutes. Conversely, providing an indication to the publisher that the number of subscribers to the topic has transitioned from one or more to zero causes the publisher to stop publishing messages to the topic (e.g., the temperature sensor will stop publishing the currently measured temperature to the temperature topic).

In various embodiments, any suitable security communication protocols may be used to protect data that is being sent between any devices (e.g., edge devices, hub devices, servers, etc.) and between devices of different networks (e.g., client networks, provider networks). For example, data may be encrypted using SSL (secure socket layer), TLS (transport layer security), HTTPS (secure hypertext transfer protocol), and/or any other suitable network security protocol.

Embodiments may provide improvements over traditional techniques used in a publish-subscribe messaging system. For example, embodiments may cause publishers (or aggregators) to only publish data to a topic when there is at least one subscriber to the topic (e.g., by notifying a publisher of life-cycle events for subscription to the topic). Using traditional techniques, a publisher may constantly publish messages to a topic, regardless of whether or not there are currently any active subscribers to the topic. By causing publishers to stop publishing messages to a topic when there are no subscribers to the topic, less bandwidth is used (e.g., due to less data being transmitted because messages for the topic are no longer transmitted to the message broker) and therefore resource usage and costs for data transmission is lowered. As described herein, the reduced bandwidth and reduced resource usage/costs for a particular client may apply to the client's local network (e.g., on-site) and/or to a provider network (e.g., a remote service provider used by the client).

Figure 1:
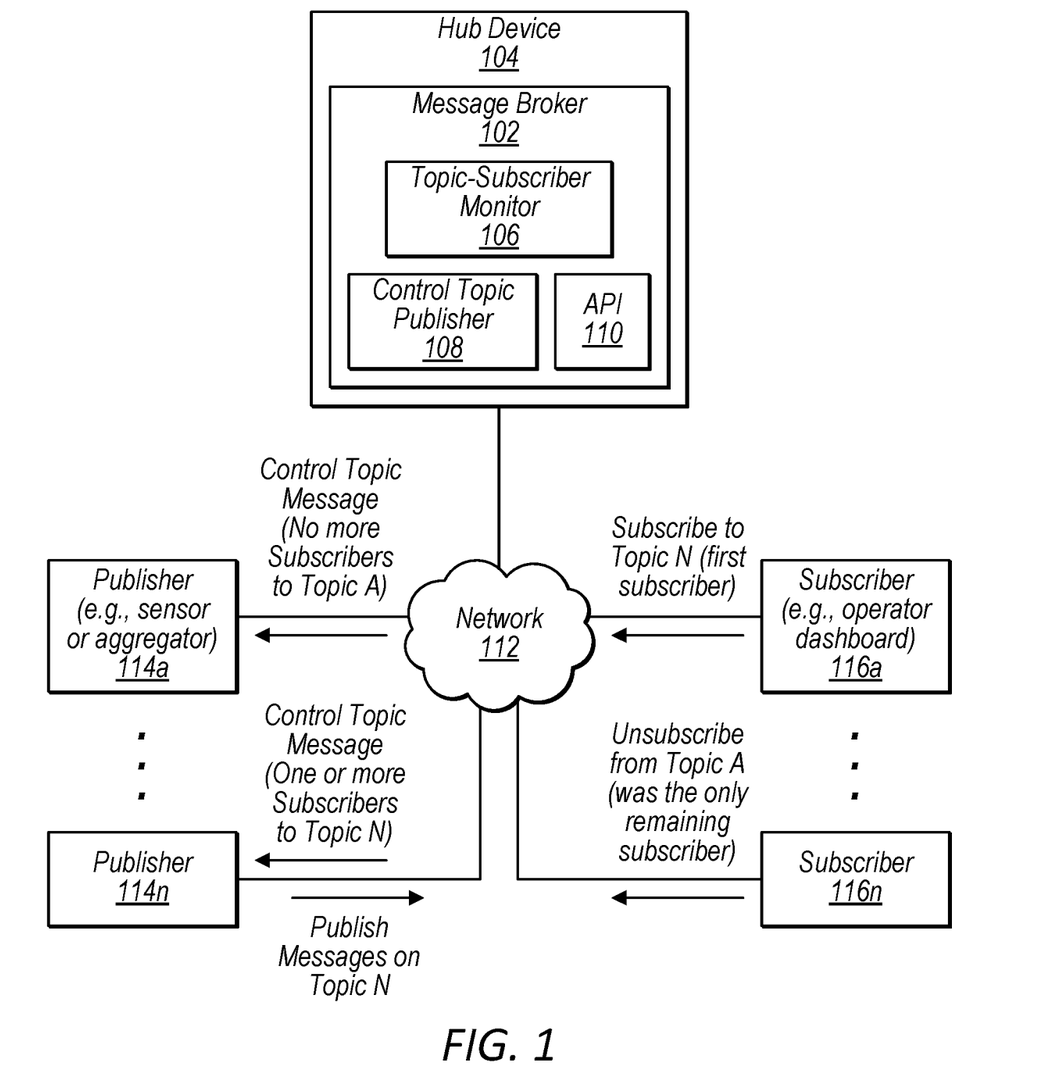
FIG. 1 illustrates a system for notifying a publisher of life-cycle events for topic subscription in a publish-subscribe messaging system, according to some embodiments.

FIG. 1 illustrates a system for notifying a publisher of life-cycle events for topic subscription in a publish-subscribe messaging system, according to some embodiments. The message broker 102 and any other components depicted in FIG. 1 may be the same as or include one or more of the same components as the message broker and any other components discussed in any of FIGS. 2-7, in embodiments. In various embodiments, the message broker and any other components discussed in any one of FIGS. 1-7 may be the same component as (e.g., same type of component) or include one or more of the same components as the message broker and any other components discussed in any other one of FIGS. 1-7.

Although FIG. 1 may describe a single hub device of a local network (e.g., a device such as the computing system of FIG. 7), in various embodiments any number of hub devices (e.g., using the same message broker) may be used instead of a single hub device. For example, in some embodiments, multiple hub devices may be used as redundant hub devices to add fault-tolerance to the system. If one or more hub devices fail, a remaining one or more hub devices may continue to operate as described. Thus, in embodiments, a hub device may synchronize state with one or more other hub devices (e.g., at periodic intervals or upon detecting an event such as addition of a new hub device or failure of a hub device).

In some embodiments, two or more hub devices may collectively perform the various described operations instead of just one hub device. Thus, two or more hub devices may each perform a particular portion of the described operations (e.g., implementing distributed processing). In other embodiments, a combination of redundant and distributed processing may be implemented via two or more hub devices.

In the depicted embodiment, a hub device 104 includes the message broker 102. The message broker 102 includes a topic-subscriber monitor 106, a control topic publisher 108, and an application programming interface (API) 110. As shown, a network 112 includes the hub device 104, any number of publishers 114a-114n, and any number of subscribers 116a-116n. In embodiments, a given publisher or subscriber may be a computing device (e.g., such as the computing system of FIG. 7) and/or may be a software application executing on a computing device. For example, a publisher may be a sensor device (e.g., temperature sensor) or an aggregator device/application. A subscriber may be a device and/or software application (e.g., an operator dashboard displayed on a computer screen). In embodiments, the network 112 may be a local network (e.g., on-site client network) or the network 112 may be a wide area network (e.g., the Internet).

In embodiments, the topic-subscriber monitor 106 monitors the number of subscribers to a given topic that a publisher is assigned to publish on. In response to detecting a life-cycle event (e.g., a change in a number of subscribers to the given topic from zero to one or more (or from one or more to zero), the topic-subscriber monitor 106 causes the control topic publisher 108 to publish a message on a system-reserved control topic that the publisher is subscribed to. As described herein, the published message may cause the publisher to start or to stop publishing messages (depending on whether or not there are subscribers). As described herein, the API 110 may provide an alternate way for a publisher to determine whether there are nay subscribers to a topic.

As shown, the subscriber 116a subscribes to topic N (publisher 114n is assigned to publish to topic N). In embodiments, to subscribe to topic N, the subscriber 116a sends a request to the message broker 102 to subscribe to topic N. In the depicted embodiment, the topic-subscriber monitor detects a transition in the number of subscribers to topic N from zero to one or more (e.g., the subscriber 116a is the first subscriber to topic N). Therefore, the message broker 102 indicates to the publisher 114n that the number of subscribers to topic N has transitioned from zero to one or more. In embodiments, the control topic publisher 108 provides the indication by publishing, on a system-reserved topic subscribed to by the publisher 114n, a message indicating that the number of subscribers to topic N has transitioned from zero to one or more. In response to receiving the indication/message, the publisher 114n begins publishing messages on topic N.

In the example embodiment, the subscriber 116n unsubscribes from topic A (publisher 114a is assigned to publish to topic A). In embodiments, to unsubscribe from topic A, the subscriber 116n sends a request to the message broker 102 to unsubscribe from topic A. In the depicted embodiment, the topic-subscriber monitor detects a transition in the number of subscribers to topic A from one or more to zero (e.g., the subscriber 116n was the only remaining subscriber to topic A). Therefore, the message broker 102 indicates to the publisher 114a that the number of subscribers to topic A has transitioned from one or more to zero. In embodiments, the control topic publisher 108 provides the indication by publishing, on a system-reserved topic subscribed to by the publisher 114a, a message indicating that the number of subscribers to topic A has transitioned from one or more to zero. In response to receiving the indication/message, the publisher 114a stops publishing messages on topic A.

In some embodiments, a given publisher may be an aggregator that publishes messages based on multiple sources of data. For example, an aggregator may receive data streams from different data sources (e.g., different temperature sensors at different locations). In embodiments, one or more of the different data sources may be any number of different types of data sources (e.g., temperature sensor, pressure sensor, power consumption, network traffic monitor, etc.). The aggregator may perform one or more operations to produce aggregated data that is different than the individual input data. The input data from the different data sources may be combined, processed, filtered and/or enriched to generate aggregated data (e.g., data that is based on the data from each of the data sources). The publisher may be assigned to publish on one or more particular topics. As described herein, the aggregator may or may not publish messages to the topic, depending on whether there are one or more subscribers to the topic.

In various embodiments, any number of the data sources for an aggregator may be publishers themselves. For example, each of the data sources may provide input data to the aggregator as messages that are published on a topic that the aggregator is subscribed to. In embodiments, when a message broker causes the aggregator to stop publishing messages due to a life-cycle event, then the message broker and/or aggregator may also cause one or more of the data sources to also stop publishing on its assigned topic. For example, if the aggregator was the only subscriber to a particular topic that a particular data source publishes on, then the message broker and/or aggregator may indicate to the particular data source (e.g., via a message published on a system-reserved control topic) that the number of subscribers to the particular topic has transitioned from one or more to zero.

In embodiments, by causing publishers/aggregators to stop publishing messages to a topic when there are no subscribers to the topic, less bandwidth is used (e.g., due to less data being transmitted). Therefore, resource usage and costs for operation of the publish-subscribe message system may be lowered. The reduced bandwidth and reduced resource usage/costs for a particular client may apply to the client's local network (e.g., on-site) and/or to a provider network (e.g., a remote service provider used by the client).

FIGS. 2A-2D illustrate examples of a message broker notifying a publisher of life-cycle events for topic subscription to a topic that the publisher is assigned to publish on. In the depicted examples, the message broker notifies (e.g., provides an indication to) the publisher of the life-cycle events by publishing a message (e.g., a life-cycle event message) to a system-reserved control topic that the publisher is subscribed to in order to cause the publisher to start and to stop publishing messages on the topic. However, in various embodiments, any other suitable communication technique may be used to provide an indication to the publisher of life-cycle events. For example, the message broker may send, via an API, a message (e.g., a life-cycle event message) to the publisher that indicates the publisher of a life-cycle event.

Figure 2A:
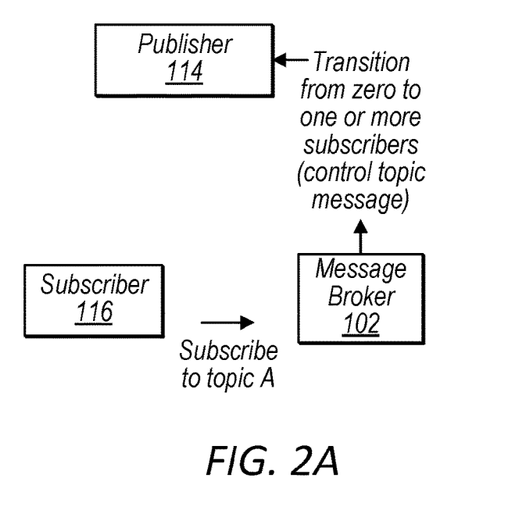
FIG. 2A illustrates an example of a message broker notifying a publisher that the number of subscribers to a topic has transitioned from zero to one or more to cause the publisher to start publishing messages on the topic, according to some embodiments.

FIG. 2A illustrates an example of a message broker notifying a publisher that the number of subscribers to a topic has transitioned from zero to one or more to cause the publisher to start publishing messages on the topic, according to some embodiments.

In the example embodiment, the publisher (e.g., publisher 114a of FIG. 1) is assigned to publish on a particular topic (e.g., "topic A"). A message broker (e.g., message broker 102 of FIG. 1) monitors the number of subscribers to the topic. As shown, the message broker detects a transition in the number of subscribers to the topic from zero to one or more (in response to receiving a request from the subscriber 116 to subscribe to topic A). In response to detecting the transition in the number of subscribers, the message broker publishes, on a system-reserved topic subscribed to by the publisher, a message indicating that the number of subscribers to the topic has transitioned from zero to one or more.

Figure 2B:
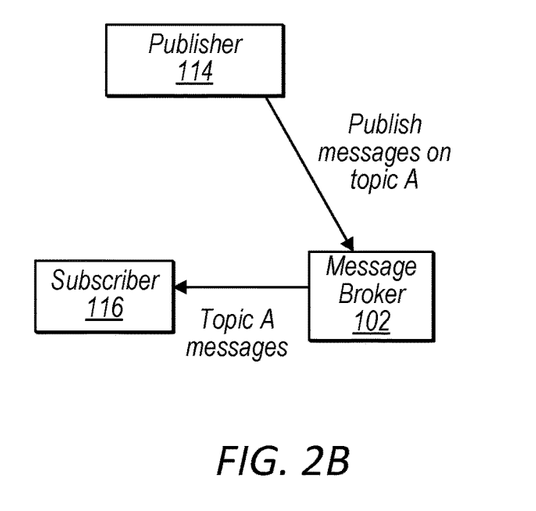
FIG. 2B illustrates an example of a publisher publishing messages on a topic and a message broker that continues to monitor the number of subscribers to the topic, according to some embodiments.

In response to receiving the message indicating that the number of subscribers to the topic has transitioned from zero to one or more, the publisher may start publishing messages on the topic (as shown in FIG. 2B). Thus, the message broker causes the publisher to start publishing messages on the topic by indicating to the publisher that the number of subscribers to the topic has transitioned from zero to one or more. In embodiments, the indication may be considered a command. For example, the indication may be a command to start publishing on the topic (e.g., a message of "start publishing" may be published on the control topic), and in response to receiving the command message, the publisher starts publishing on the topic.

In embodiments, the message broker may use any suitable technique to monitor/determine the number of subscribers to a given topic that a publisher is assigned to publish on. In some embodiments, when the message broker receives a request from a device and/or application to subscribe to the topic, the message broker subscribes the device and/or application to the topic and adds one subscriber to a total subscriber count for that topic. After the device/application is subscribed to the topic, the message broker forwards any messages published to that topic to the subscribed device/application. Conversely, when the message broker receives a request from a device and/or application to unsubscribe from the topic, the message broker unsubscribes the device and/or application from the topic and subtracts one subscriber from a total subscriber count for that topic. After the device/application is unsubscribed to the topic, the message broker no longer forwards messages published to that topic to the unsubscribed device/application.

In various embodiments, the message broker may use other techniques instead of or in addition to those discussed above in order to monitor/determine the number of subscribers to a given topic that a publisher is assigned to publish on. For example, the message broker may send a request to a subscriber (e.g., via an API of the message broker) to verify whether or not the subscriber wants to continue to be subscribed to the topic. The subscriber may then indicate to the message broker whether it wants to continue to be subscribed or to unsubscribe from the topic.

In some embodiments, if the message broker has not received any messages from the subscriber for a threshold period of time (e.g., subscription confirmation messages, periodic heartbeat messages), then the message broker may unsubscribe the subscriber from the topic and/or from any other topics that the subscriber was subscribed to. In some cases, the message broker may unsubscribe the subscriber if the subscriber has been disconnected for a threshold period of time. In some embodiments, the message broker may determine, based on querying one or more databases and/or data structures for the number of active subscribers to a given topic, the number of subscribers to the given topic. For example, in response to receiving a message from a publisher to be published on the given topic, the message broker may then determine the number of active subscribers to the given topic (e.g., by querying or API request). In response to determining there has been a life-cycle transition (e.g., zero to one or more or one or more to zero subscribers), then the message broker indicates the transition to the publisher.

FIG. 2B illustrates an example of a publisher publishing messages on a topic and a message broker that continues to monitor the number of subscribers to the topic, according to some embodiments.

As shown, the publisher continues to publish messages on the topic assigned to the publisher because there are one or more subscribers to the topic. The message broker continually monitors the number of subscribers that are currently subscribed to the topic. In embodiments, as long as one or more subscribers remain actively subscribed to the topic, the message broker will not publish a control message to cause the publisher to stop publishing to the topic. For example, any number of additional subscribers may be added as new subscribers and/or unsubscribed at a later time.

In some embodiments, at any point in time the message broker may receive, from the publisher via an API, a request for an indication of whether there are any subscribers to the topic. In response to the request, the message broker may send, to the publisher via the API, the indication of whether there are any subscribers to the topic. This may be useful if the publisher missed a message published on the system-reserved control topic to cause the publisher to start or stop publishing (e.g., due to network failures, etc.). By querying the message broker via an API (e.g., on a periodic basis or in response to an event), the publisher may begin publishing messages sooner than it would have if it waited for another control topic message from the message broker. Therefore, subscribers may miss fewer messages due to network errors.

Figure 2C:
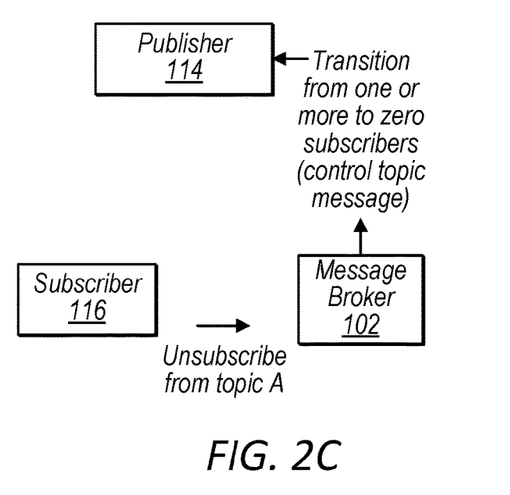
FIG. 2C illustrates an example of a message broker notifying a publisher that the number of subscribers to a topic has transitioned from one or more to zero to cause the publisher to stop publishing messages on the topic, according to some embodiments.

FIG. 2C illustrates an example of a message broker notifying a publisher that the number of subscribers to a topic has transitioned from one or more to zero to cause the publisher to stop publishing messages on the topic, according to some embodiments.

As depicted, the message broker detects a transition in the number of subscribers to the topic from one or more to zero (in response to receiving a request from the subscriber 116 to unsubscribe from topic A, where the subscriber 116 is the only active subscriber to topic A). In response, the message broker publishes, on a system-reserved topic subscribed to by the publisher, a message indicating that the number of subscribers to the topic has transitioned from one or more to zero.

Figure 2D:
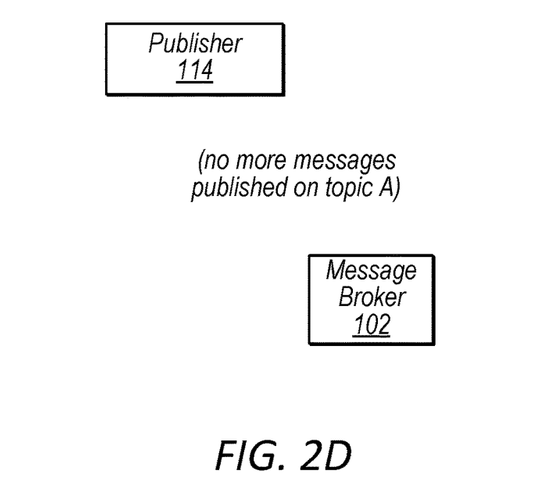
FIG. 2D illustrates an example of a publisher that is no longer publishing messages on a topic and a message broker that continues to monitor the number of subscribers to the topic, according to some embodiments.

In response to receiving the message indicating that the number of subscribers to the topic has transitioned from one or more to zero, the publisher may stop publishing messages on the topic (as shown in FIG. 2D). Thus, the message broker causes the publisher to stop publishing messages on the topic by indicating to the publisher that the number of subscribers to the topic has transitioned from one or more to zero. In embodiments, the indication may be considered a command. For example, the indication may be a command to stop publishing on the topic (e.g., a message of "stop publishing" may be published on the control topic), and in response to receiving the command message, the publisher stops publishing on the topic.

FIG. 2D illustrates an example of a publisher that is no longer publishing messages on a topic and a message broker that continues to monitor the number of subscribers to the topic, according to some embodiments.

As shown, the publisher is no longer publishing messages on the topic assigned to the publisher because there are one or more subscribers to the topic. The message broker continues to monitor the number of subscribers that are currently subscribed to the topic (currently the number of subscribers is zero). In embodiments, as long as there are no subscribers to the topic, the message broker will not publish a control message to cause the publisher to start publishing to the topic.

The cycle depicted in FIGS. 2A-2D may occur any number of times (e.g., by publishing messages on the system-reserved topic). For example, a message broker may detect a life-cycle event and in response, cause a publisher to stop publishing on a topic. At a later point in time, the message broker may detect another life-cycle event and in response, cause the publisher to start publishing on the topic. At a later point in time, the message broker may detect another life-cycle event and in response, cause the publisher to stop publishing on a topic again.

Figure 3:
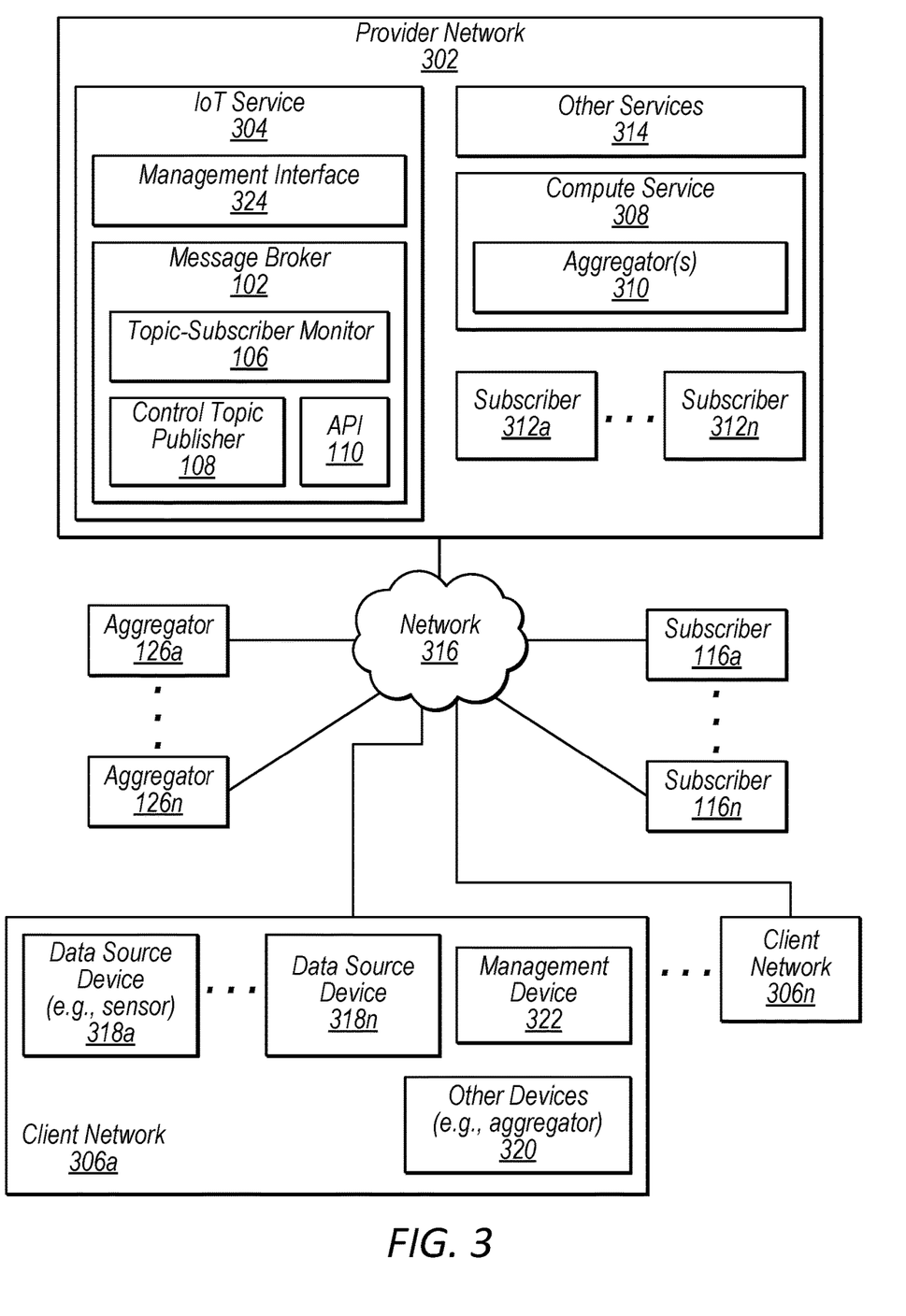
FIG. 3 is a block diagram of a system for notifying a publisher of life-cycle events for topic subscription in a publish-subscribe messaging system, according to some embodiments.

FIG. 3 is a block diagram of a system for notifying a publisher of life-cycle events for topic subscription in a publish-subscribe messaging system, according to some embodiments.

In the depicted embodiments, a provider network 302 may provide services to any number of clients of the provider network. For example, the provider network includes an IoT service 304 that may provide services to any number of remote client networks 306. As shown, the IoT service 304 includes a message broker (e.g., message broker 102). The message broker includes a topic-subscriber monitor 106, a control topic publisher 108, and an API 110. In embodiments, the message broker may include some or all of the functionality described in FIG. 1.

The provider network also includes a compute service 308 that provides any number of aggregators 310. The provider network also includes any number of subscribers 312a-312n as well as any number of other services 314 (e.g., data storage services, etc.). As shown, there may also be any number of external subscribers 116a-116n (e.g., mobile devices or other stand-alone client devices).

In the depicted embodiment, a client network 306 (or a stand-alone client device 116) may communicate with the provider network 302 by transmitting data via a wide-area network 316 (e.g., the internet). Thus, the provider network 302 may be considered a remote provider network with respect to any devices of a client network 306 and may be in another physical location than the client device/client network (e.g., another building, city, state, or country). As depicted, devices of any number of client networks 306 (e.g., corresponding to different clients of the provider network or IoT service) may communicate with the provider network via the network 116.

As shown, any given client network (e.g., client network 306a) may include any number of data source devices 318a-318n. A data source device may be any device (and software application executing on the device) that collects and/or provides data to another device and/or network. For example, a data source device 318 may provide data to the provider network (e.g., to an aggregator 310 or the message broker 102) and/or to another device 320. As described herein, in some embodiments, a data source device may provide data by publishing to a topic.

In embodiments, any given client network may include a management device 322 that may be used by an administrator/user to manage and/or configure the IoT service 304 (including the message broker 102) via a management interface 324. For example, the management interface 324 may provide an API that allows for a user to submit configuration commands from the management device 322 to the IoT service (e.g., by using a graphical user interface and/or command line interface displayed by the management device 322).

In the depicted embodiment, an aggregator 310 executed by the compute service 308 may aggregate data from different data source devices 318 at a client network (e.g., client network 306a). For example, the aggregator 310 may receive data streams from three different sensors (e.g., temperature, pressure, humidity), process data from each of the data streams to generate processed data that is different than the originally received data, and generate one or more messages that include the processed data (or at least a portion of the processed data). In embodiments, any type of data source device may be used to provide any type of data. For example, at least some of the data source devices may provide industrial or manufacturing data indicating equipment health, reliability, equipment failure rates, production output, etc.

As described herein, the aggregator may or may not publish the data to a topic assigned to the aggregator, depending on whether there are any subscribers to the topic. For example, the message broker may use a control topic to publish life-cycle event messages, which in turn cause the aggregator to start or to stop publishing messages on the aggregator's topic. Any number of the internal subscribers 312 and/or external subscribers 116 may subscribe to the aggregator's topic.

In embodiments, any number of aggregators may publish messages on any number of respective topics. In embodiments, each of the aggregators may generate messages that are based on a different number and/or combination of data source devices. For example, a first aggregator may generate messages based on data streams from three data source devices of the client network 306a, while a second aggregator generates messages based on data streams from seven data source devices of the client network 306a that may or may not include any of the data source devices used by the first aggregator. Moreover, an aggregator may generate messages based on data streams from data source devices of any number of different remote networks.

In some embodiments, any number of the data sources devices 318 may be publishers themselves. For example, each of a group of data sources devices may provide input data to a particular aggregator 310 as messages that are published on a topic that the aggregator is subscribed to. In embodiments, when a message broker causes the aggregator to stop publishing messages due to a life-cycle event, then the message broker and/or aggregator may also cause one or more of the data sources devices to also stop publishing on its assigned topic. For example, if the aggregator was the only subscriber to a particular topic that a particular data sources devices publishes on, then the message broker and/or aggregator may indicate to the particular data sources devices (e.g., via a message published on a system-reserved control topic) that the number of subscribers to the particular topic has transitioned from one or more to zero.

In various embodiments, the aggregator 310 may instead be located at the client network or as a stand-alone aggregator 126a-126n (e.g., on a stand-alone device such as a smart phone on a cellular network or a laptop with another third-party network). In embodiments, one of the other devices 320 at the client network (or software executing on the other device 320) may be a client network aggregator. The client network aggregator may perform in the same or similar way as described above for the aggregator 310 at the provider network. For example, the client network aggregator may publish messages to a topic that are based on data/data streams received by any number of the data source devices 318. As described above, any number of the internal subscribers 312 and/or external subscribers 116 may subscribe to the client network aggregator's topic. Moreover, a client network may include any number of client network aggregators.

In some embodiments, an aggregator 310 at the provider network may subscribe to one or more client network aggregators. Therefore, a given aggregator 310 at the provider network may subscribe to any number of data source device topics and/or any number of client network aggregator topics. For example, a particular aggregator 310 at the provider network may subscribe to five topics that five different client network aggregators publish to and the particular aggregator 310 may also subscribe to three topics that three different data source devices publish to. In this case, the particular aggregator 310 at the provider network may publish messages to its own topic that are based on eight different data streams—five from the client network aggregators and three from the data source devices.

In embodiments, a stand-alone aggregator 126 may perform some or all of the functions described above for the client network aggregator or the aggregator 310 at the provider network. For example, a stand-alone aggregator 126 may publish messages to a topic that are based on data/data streams received by any number of the data source devices 318 of the client network 306a and/or other one or more other client networks. Similarly, an aggregator 310 at the provider network may subscribe to one or more stand-alone aggregators.

By using one or more aggregators at the client network, additional bandwidth may be conserved when there are no subscribers to the aggregator's topic. For example, the aggregator will not messages from the client network to the provider network in order to publish messages when there are no active subscribers to consume the messages. This may reduce resource consumption and increase resource efficiency for the client at both the client network as well as the provider network. By reducing resource consumption across the client and provider network, a client may also save on any costs/charges associated with resource usage due to bandwidth consumption.

Figure 4:
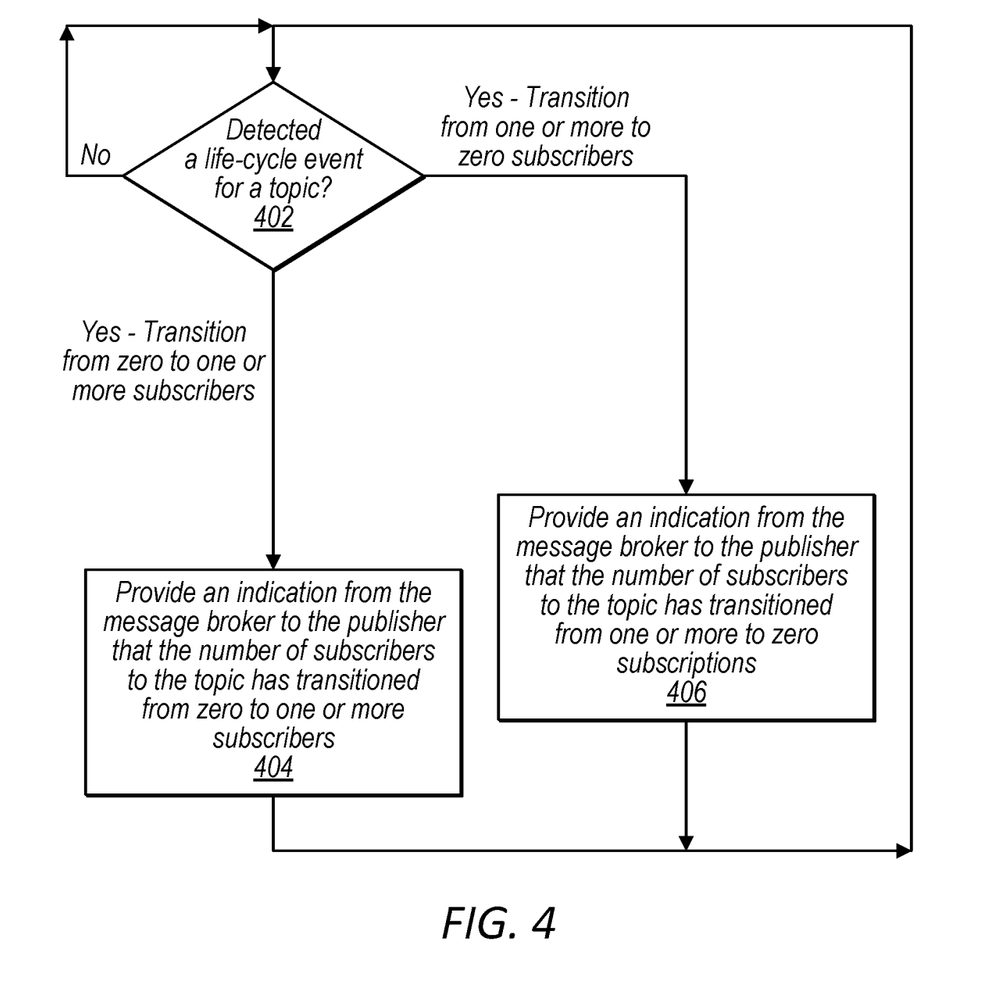
FIG. 4 is a flow diagram that illustrates notifying a publisher of life-cycle events for topic subscription in a publish-subscribe messaging system, according to some embodiments.

FIG. 4 is a flow diagram that illustrates notifying a publisher of life-cycle events for topic subscription in a publish-subscribe messaging system, according to some embodiments. At block 402, a message broker determines whether it has detected a life-cycle event for a topic that a publisher is assigned to publish on. For example, the message broker may determine whether there is a transition in a number of subscribers to a topic from zero to one or more or from one or more to zero. As described for FIG. 2A, the message broker may use any suitable technique to monitor/determine the number of subscribers to a given topic that a publisher is assigned to publish on.

If a life-cycle event has not been detected at block 402, then the message broker may continue to monitor for life-cycle events. If the message broker detects a life-cycle event for a topic at block 402, then if the detected life-cycle event is a transition in the number of subscribers to the topic from zero to one or more subscribers, at block 404 the message broker provides an indication to the publisher that the number of subscribers to the topic has transitioned from zero to one or more. If the detected life-cycle event is a transition in the number of subscribers to the topic from one or more to zero subscribers, at block 406 the message broker provides an indication to the publisher that the number of subscribers to the topic has transitioned from one or more to zero.

Figure 5:
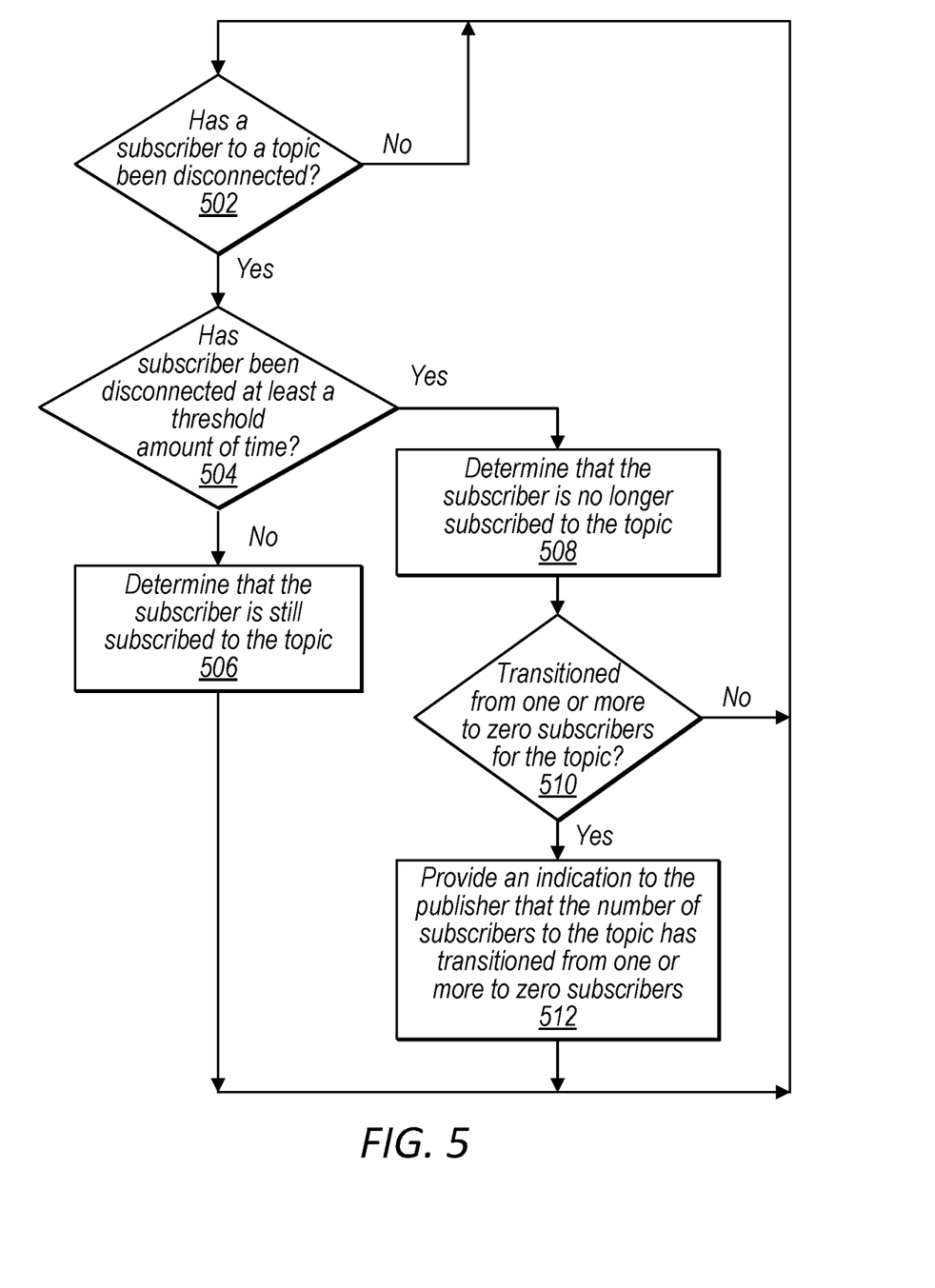
FIG. 5 is a flow diagram that illustrates handling a subscriber disconnection in a publish-subscribe messaging system, according to some embodiments.

FIG. 5 is a flow diagram that illustrates handling a subscriber disconnection in a publish-subscribe messaging system, according to some embodiments. At block 502, the message broker determines whether a subscriber to a publisher's topic has been disconnected (e.g., a subscriber to a topic that the publisher is assigned to publish on). Although the process is described for one subscriber, a message broker may perform the following process for any number of disconnected devices concurrently or at approximately the same time.

For example, the message broker may determine that a subscriber is no longer able to communicate with the message broker and/or the publish-subscribe messaging system (e.g., due to loss of internet connection to the subscriber, router failure, etc.). If no subscriber has been disconnected, the message broker continues to monitor for any disconnections.

If the message broker determines that a subscriber has been disconnected, then at block 504, the message broker determines whether the disconnected subscriber has been disconnected for at least a threshold amount of time. If not, then at block 506, the message broker determines that the subscriber is still connected to the topic. For example, the message broker may determine that the subscriber is able to communicate with the message broker and/or the publish-subscribe messaging system (e.g., re-establishing the connection due to regaining internet connection).

Returning to block 504, if the message broker determines that the disconnected subscriber has been disconnected for at least a threshold amount of time, then at block 508, the message broker determines that the subscriber is no longer subscribed to the topic. At block 510, the message broker determines whether there has been a transition from one or more to zero subscribers to the publisher's topic. If not, then the process returns to block 502, where the message broker continues to monitor for any disconnected subscribers.

At block 510, if the message broker determines that there has been a transition from one or more to zero subscribers to the publisher's topic, then at block 512, the message broker provides an indication to the publisher that the number of subscribers to the topic has transitioned from one or more to zero subscribers. The process then returns to block 502, where the message broker continues to monitor for any disconnected subscribers.

Figure 6:
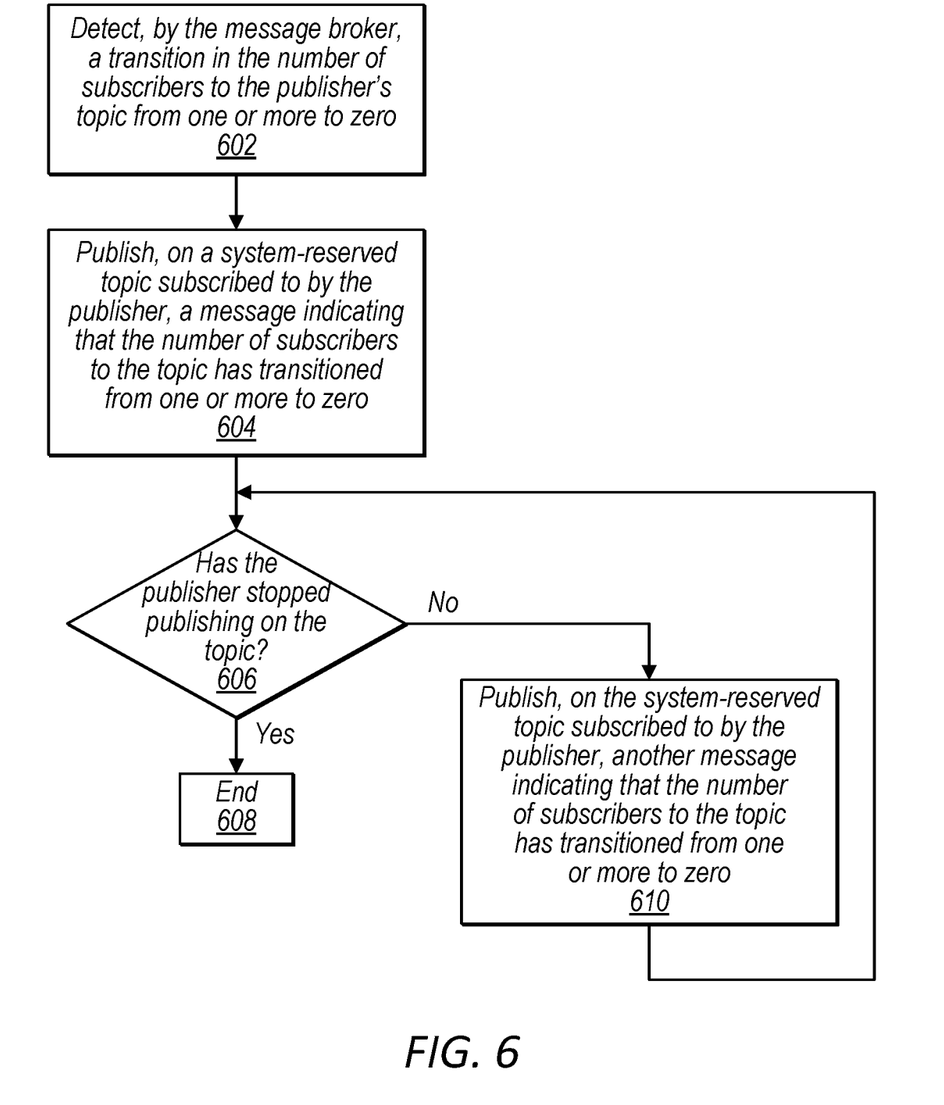
FIG. 6 is a flow diagram that illustrates notifying a publisher of life-cycle events for topic subscription using a system-reserved topic subscribed to by the publisher, according to some embodiments.

FIG. 6 is a flow diagram that illustrates notifying a publisher of life-cycle events for topic subscription using a system-reserved topic subscribed to by the publisher, according to some embodiments. At block 602, a message broker detects a transition in the number of subscribers to a publisher's topic from one or more to zero. At block 604, the message broker publishes, on a system-reserved topic subscribed to by the publisher, a message indicating that the number of subscribers to the topic has transitioned from one or more to zero.

At block 606, the message broker determines whether the publisher has stopped publishing on the topic. If so, then the process ends at block 608. If the message broker determines that the publisher has not stopped publishing on the topic, then at block 610, the message broker publishes another message indicating that the number of subscribers to the topic has transitioned from one or more to zero. The process then returns to block 606, where the message broker determines whether the publisher has stopped publishing on the topic.

In embodiments, the message broker may determine that the publisher has not stopped publishing based on detecting one or more messages published on the topic. For example, subsequent to publishing the message on the system-reserved topic indicating that the number of subscribers to the topic has transitioned from one or more to zero, the message broker may detect a threshold number of messages (e.g., 10 messages) that the publisher has published on the topic and in response, determine that the publisher has not stopped publishing on the topic.

In some embodiments, after a threshold amount of time (e.g., 2 seconds) since publishing the message on the system-reserved topic indicating that the number of subscribers to the topic has transitioned from one or more to zero, the message broker may detect a message that the publisher has published on the topic. In response to detecting the message, the message broker may determine that the publisher has not stopped publishing on the topic.

In various embodiments, a message broker may publish an additional life-cycle message to a system-reserved control topic if the message broker determines that a publisher has not published messages for a significant amount of time. For example, after a threshold amount of time (e.g., 10 minutes) since publishing a message on the system-reserved topic indicating that the number of subscribers to the publisher's topic has transitioned from zero to one or more, the message broker may determine that the publisher has not published any messages on the topic. In response, the message broker may publish, on the system-reserved topic, another message indicating that the number of subscribers to the topic has transitioned from zero to one or more.

Figure 7:
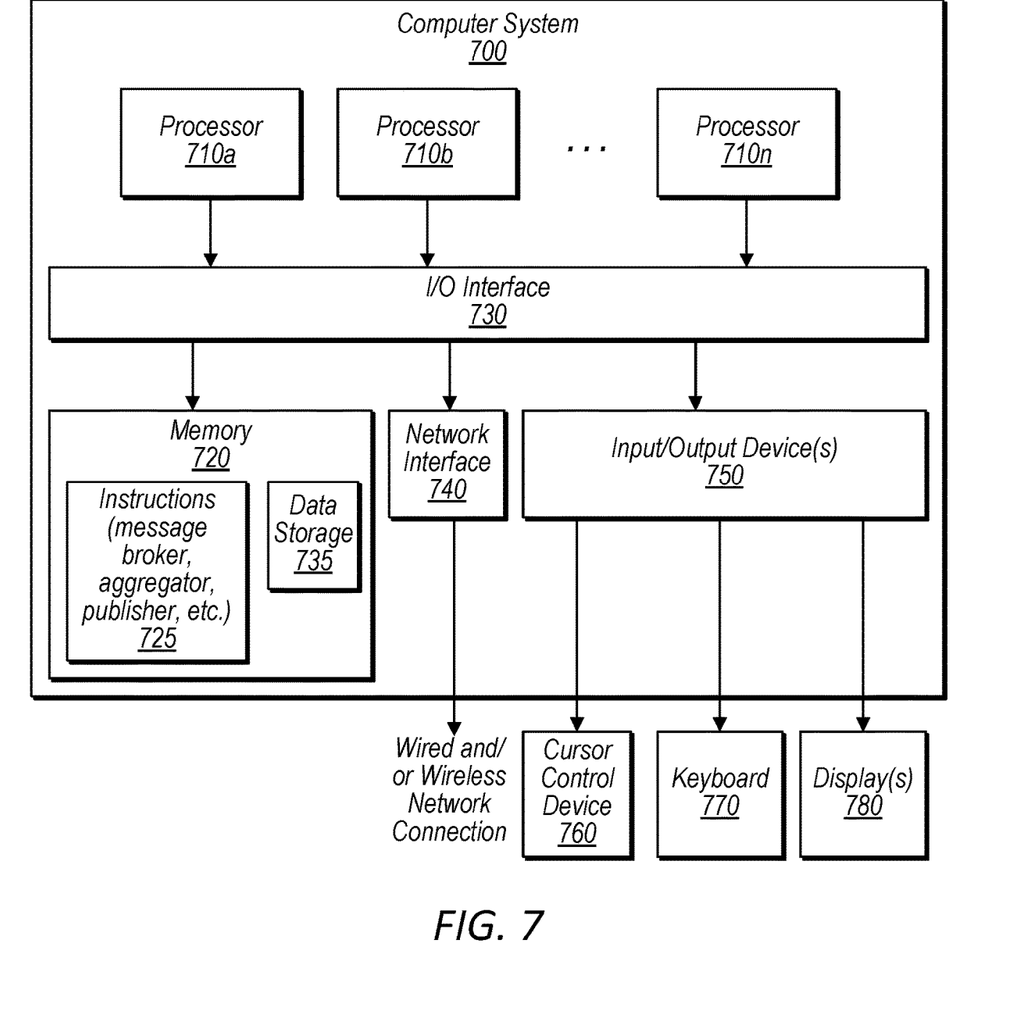
FIG. 7 is a block diagram illustrating an example computer system that implements some or all of the techniques described herein, according to some embodiments.

Any of various computer systems may be configured to implement processes associated with the message broker or any other component of the above figures. For example, FIG. 7 is a block diagram illustrating an example computer system that implements some or all of the techniques described herein, according to some embodiments. In various embodiments, the message broker, aggregator, publisher, subscriber, provider network, client network, hub device, or any other component of any of FIGS. 1-6 may each include one or more computer systems 700 such as that illustrated in FIG. 7. In embodiments, the message broker, aggregator, publisher, subscriber, provider network, client network, hub device, or any other component may include one or more components of the computer system 700 that function in a same or similar way as described for the computer system 700.

In the illustrated embodiment, computer system 700 includes one or more processors 710 coupled to a system memory 720 via an input/output (I/O) interface 730. Computer system 700 further includes a network interface 740 coupled to I/O interface 730. In some embodiments, computer system 700 may be illustrative of servers implementing enterprise logic or downloadable application, while in other embodiments servers may include more, fewer, or different elements than computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be embedded processors implementing any of a variety of instruction set architectures (ISAs), such as the x106, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor 710. In various embodiments, system memory 720 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the message broker, provider network, client network, or hub device are shown stored within system memory 720 as program instructions 725. In some embodiments, system memory 720 may include data 735 which may be configured as described herein.

In one embodiment, I/O interface 730 may be configured to coordinate I/O traffic between processor 710, system memory 720 and any peripheral devices in the system, including through network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments, some or all of the functionality of I/O interface 730, such as an interface to system memory 720, may be incorporated directly into processor 710.

Network interface 740 may be configured to allow data to be exchanged between computer system 700 and other computer systems 700 or devices attached to a network, such as the local network discussed above, a wide-area network, or a local network within the provider network, for example. In particular, network interface 740 may be configured to allow communication between computer system 700 and/or various I/O devices 750. I/O devices 750 may include scanning devices, display devices, input devices and/or other communication devices, as described herein. Network interface 740 may commonly support one or more wireless networking protocols (e.g., Wi-Fi/IEEE 802.11, or another wireless networking standard). However, in various embodiments, network interface 740 may support communication via any suitable wired or wireless general data networks, such as other types of Ethernet networks, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 700 via I/O interface 730. A computer-readable storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

In some embodiments, I/O devices 750 may be relatively simple or "thin" client devices. For example, I/O devices 750 may be configured as dumb terminals with display, data entry and communications capabilities, but otherwise little computational functionality. However, in some embodiments, I/O devices 750 may be computer systems configured similarly to computer system 700, including one or more processors 710 and various other devices (though in some embodiments, a computer system 700 implementing an I/O device 750 may have somewhat different devices, or different classes of devices).

In various embodiments, I/O devices 750 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 750 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 700. In general, an I/O device 750 (e.g., cursor control device 760, keyboard 770, or display(s) 780 may be any device that can communicate with elements of computing system 700.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the message broker, aggregator, publisher, subscriber, hub device, provider network, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:
1. A system, comprising:
one or more processors; and
one or more memories, wherein the one or more memories have stored thereon instructions, which when executed by the one or more processors, cause the one or more processors to implement a message broker of a publish-subscribe messaging system, wherein for a given topic that a publisher of the messaging system is assigned to publish messages on, the message broker is configured to:

detect a transition in a number of subscribers to the topic from zero to one or more or from one or more to zero;

receive, by the message broker from the publisher via an application programming interface (API), a request for an indication of whether there are any subscribers to the topic; and in response to the request, send, from the message broker to the publisher via the API, the indication of whether there are any subscribers to the topic, wherein the indication sent from the message broker to the publisher via the API is based on the detection by the message broker of the transition in the number of subscribers to the topic.

2. The system as recited in claim 1, wherein the message broker is configured to:

publish, on a system-reserved topic subscribed to by the publisher, a message indicating that the number of subscribers to the topic has transitioned from one or more to zero.

3. The system as recited in claim 2, wherein the message broker is further configured to:

subsequent to the detection of the transition in the number of subscribers to the topic from one or more to zero:

detect another transition in the number of subscribers to the topic from zero to one or more; and in response to the detection of the other transition in the number of subscribers to the topic from zero to one or more:

publish, on the system-reserved topic subscribed to by the publisher, another message indicating that the number of subscribers to the topic has transitioned from zero to one or more.

4. The system as recited in claim 1, wherein the message broker is configured to:

in response to the detection of the transition in the number of subscribers to the topic from zero to one or more or from one or more to zero:

provide an indication to the publisher that the number of subscribers to the topic has transitioned from zero to one or more to cause the publisher to begin publishing messages to the topic, or provide another indication to the publisher that the number of subscribers to the topic has transitioned from one or more to zero to cause the publisher to stop publishing messages to the topic.

5. The system as recited in claim 1, wherein to detect the transition in the number of subscribers to the topic from one or more to zero, the message broker is configured to:

determine that the one or more subscribers have been disconnected from the publish-subscribe messaging system for at least a threshold amount of time; and in response to the determination that the one or more subscribers have been disconnected for at least the threshold amount of time, determine that the one or more subscribers are no longer subscribed to the topic.

6. A method, comprising:

performing, by one or more computing devices that implement a message broker of a publish-subscribe messaging system:

for a given topic that a publisher is assigned to publish messages on:

detecting a transition in a number of subscribers to the topic from zero to one or more or from one or more to zero;

receiving, by the message broker from the publisher via an application programming interface (API), a request for an indication of whether there are any subscribers to the topic; and in response to the request, sending, from the message broker to the publisher via the API, the indication of whether there are any subscribers to the topic, wherein the indication sent from the message broker to the publisher via the API is based on the detection by the message broker of the transition in the number of subscribers to the topic.

7. The method as recited in claim 6, further comprising:

publishing, on a system-reserved topic subscribed to by the publisher, a message indicating that the number of subscribers to the topic has transitioned from one or more to zero.

8. The method as recited in claim 7, further comprising:

subsequent to publishing the message on the system-reserved topic indicating that the number of subscribers to the topic has transitioned from one or more to zero, determining, by the message broker, that the publisher has not stopped publishing on the topic; and in response to determining that the publisher has not stopped publishing on the topic, publishing, by the message broker on the system-reserved topic, another message indicating that the number of subscribers to the topic has transitioned from one or more to zero.

9. The method as recited in claim 8, wherein determining that the publisher has not stopped publishing on the topic comprises:

subsequent to publishing the message on the system-reserved topic indicating that the number of subscribers to the topic has transitioned from one or more to zero, detecting a threshold number of messages that the publisher has published on the topic.

10. The method as recited in claim 8, wherein determining that the publisher has not stopped publishing on the topic comprises:

after a threshold amount of time since publishing the message on the system-reserved topic indicating that the number of subscribers to the topic has transitioned from one or more to zero, detecting a message that the publisher has published on the topic.

11. The method as recited in claim 6, further comprising:

publishing, on a system-reserved topic subscribed to by the publisher, a message indicating that the number of subscribers to the topic has transitioned from zero to one or more;

determining by the message broker, after a threshold amount of time since publishing the message on the system-reserved topic indicating that the number of subscribers to the topic has transitioned from zero to one or more, that the publisher has not published any messages on the topic; and in response to determining that the publisher has not published any messages on the topic after the threshold amount of time, publishing by the message broker, on the system-reserved topic, another message indicating that the number of subscribers to the topic has transitioned from zero to one or more.

12. The method as recited in claim 6, further comprising:

in response to detecting the transition:

providing an indication to the publisher that the number of subscribers to the topic has transitioned from zero to one or more to cause the publisher to begin publishing messages to the topic, or providing another indication to the publisher that the number of subscribers to the topic has transitioned from one or more to zero to cause the publisher to stop publishing messages to the topic.

13. The method as recited in claim 6, wherein detecting the transition in the number of subscribers to the topic from one or more to zero comprises:
   determining, by the message broker, that the one or more subscribers have been disconnected from the publish-subscribe messaging system for at least a threshold amount of time; and
   in response to the determination that the one or more subscribers have been disconnected for at least the threshold amount of time, determining, by the message broker, that the one or more subscribers are no longer subscribed to the topic.

14. The method as recited in claim 6, wherein a provider network comprises the message broker and the publisher, and wherein the messages published on the given topic by the publisher are based on data streams generated by respective devices of a remote client network.

15. One or more non-transitory computer-accessible storage media storing program instructions that when executed on or across one or more processors cause the one or more processors to implement a message broker of a publish-subscribe messaging system to:
   for a given topic that a publisher is assigned to publish messages on:
      detect a transition in a number of subscribers to the topic from zero to one or more or from one or more to zero;
      receive, by the message broker from the publisher via an application programming interface (API), a request for an indication of whether there are any subscribers to the topic; and
      in response to the request, send, from the message broker to the publisher via the API, the indication of whether there are any subscribers to the topic, wherein the indication sent from the message broker to the publisher via the API is based on the detection by the message broker of the transition in the number of subscribers to the topic.

16. The one or more storage media as recited in claim 15, wherein the program instructions when executed on or across the one or more processors further cause the one or more processors to:
   publish, on a system-reserved topic subscribed to by the publisher, a message indicating that the number of subscribers to the topic has transitioned from one or more to zero.

17. The one or more storage media as recited in claim 16, further comprising program instructions that when executed on or across the one or more processors further cause the one or more processors to:
   subsequent to publishing of the message on the system-reserved topic indicating that the number of subscribers to the topic has transitioned from one or more to zero, determine, by the message broker, that the publisher has not stopped publishing on the topic; and
   in response to the determination that the publisher has not stopped publishing on the topic, publish, by the message broker on the system-reserved topic, another message indicating that the number of subscribers to the topic has transitioned from one or more to zero.

18. The one or more storage media as recited in claim 17, wherein to determine that the publisher has not stopped publishing on the topic, the program instructions when executed on or across the one or more processors further cause the one or more processors to:
   subsequent to publishing of the message on the system-reserved topic indicating that the number of subscribers to the topic has transitioned from one or more to zero, detect a threshold number of messages that the publisher has published on the topic.

19. The one or more storage media as recited in claim 15, further comprising program instructions that when executed on or across the one or more processors further cause the one or more processors to:
   in response to the detection of the transition in the number of subscribers to the topic from zero to one or more or from one or more to zero:
      provide an indication to the publisher that the number of subscribers to the topic has transitioned from zero to one or more to cause the publisher to begin publishing messages to the topic, or
      provide another indication to the publisher that the number of subscribers to the topic has transitioned from one or more to zero to cause the publisher to stop publishing messages to the topic.

20. The one or more storage media as recited in claim 15, wherein to detect the transition in the number of subscribers to the topic from one or more to zero, the program instructions when executed on or across the one or more processors further cause the one or more processors to:
   determine, by the message broker, that the one or more subscribers have been disconnected from the publish-subscribe messaging system for at least a threshold amount of time; and
   in response to the determination that the one or more subscribers have been disconnected for at least the threshold amount of time, determine, by the message broker, that the one or more subscribers are no longer subscribed to the topic.

* * * * *